United States Patent
Okugawa et al.

(10) Patent No.: US 9,440,569 B2
(45) Date of Patent: Sep. 13, 2016

(54) VEHICLE SEAT AND METHOD OF MANUFACTURING THE SAME

(71) Applicant: TOYOTA BOSHOKU KABUSHIKI KAISHA, Aichi-ken (JP)

(72) Inventors: Akiyoshi Okugawa, Aichi-ken (JP); Kazuya Suzuki, Aichi-ken (JP)

(73) Assignee: TOYOTA BOSHOKU KABUSHIKI KAISHA, Aichi-Ken ( * ) Notice: Subject to any disclaimer, the term of this patent is extended or adjusted under 35 U.S.C. 154(b) by 0 days.

(21) Appl. No.: 14/305,286

(22) Filed: Jun. 16, 2014

(65) Prior Publication Data

US 2014/0375105 A1 Dec. 25, 2014

(30) Foreign Application Priority Data

Jun. 19, 2013 (JP) ................. 2013-128240

(51) Int. Cl.
*A47C 31/02* (2006.01)
*B60N 2/58* (2006.01)

(52) U.S. Cl.
CPC ........... *B60N 2/5891* (2013.01); *B60N 2/5825* (2013.01); *Y10T 29/481* (2015.01)

(58) Field of Classification Search
CPC ................... B60N 2/5891; B60N 2/5825
USPC ............. 297/15, 218.1, 218.2, 218.3, 218.4, 297/218.5, 378.1, 452.6
See application file for complete search history.

(56) References Cited

U.S. PATENT DOCUMENTS

| | | | | |
|---|---|---|---|---|
| 4,789,201 A * | 12/1988 | Selbert | | 297/218.1 |
| 5,503,454 A * | 4/1996 | Sakamoto | | 297/218.1 |
| 5,658,046 A * | 8/1997 | Rus | | 297/378.1 |
| 6,623,061 B2 * | 9/2003 | Tourangeau et al. | | 296/63 |
| 6,964,453 B1 * | 11/2005 | Flegal | | B60N 2/5825 297/452.6 |
| 8,157,324 B2 * | 4/2012 | Matsuzaki et al. | | 297/218.1 |
| 8,733,834 B2 * | 5/2014 | Palmer | | 297/218.5 |
| 8,752,902 B2 * | 6/2014 | Labish | | B68G 7/12 297/218.2 |
| 8,833,847 B2 * | 9/2014 | Nishiyama | | 297/378.1 X |
| 2001/0002759 A1 * | 6/2001 | Nishide | | 297/15 X |
| 2009/0295215 A1 * | 12/2009 | Galbreath | | A01K 1/0272 297/452.6 |
| 2013/0119730 A1 * | 5/2013 | Nakagawa et al. | | 297/218.1 |
| 2014/0183913 A1 * | 7/2014 | Hage-Hassan et al. | | 297/218.3 |

FOREIGN PATENT DOCUMENTS

JP 6-82968 11/1994
JP 2013-102855 5/2013

* cited by examiner

*Primary Examiner* — Rodney B White
(74) *Attorney, Agent, or Firm* — Greenblum & Bernstein, P.L.C.

(57) ABSTRACT

There is provided a method of manufacturing a vehicle seat configured by covering a seat cover on a sitting surface side of a seat frame via a seat pad and by covering a non-sitting surface side of the seat frame with a carpet, the vehicle seat including an end fixing part having a groove into which both ends of the seat cover and the carpet are to be inserted and fixed. The method includes fixing, to the end of the seat cover, an insertion member having stiffness, which can be inserted and fixed in the groove integrally with the seat cover, arranging the carpet such that the end thereof covers an entrance of the groove, and inserting the insertion member into the groove to thus push and fix the end of the carpet in the groove while the end of the carpet abuts on the insertion member.

7 Claims, 3 Drawing Sheets

VEHICLE SEAT AND METHOD OF MANUFACTURING THE SAME

BACKGROUND OF THE INVENTION

1. Field of the Invention

The present invention relates to a vehicle seat of an automobile, an airplane, a ship, a train and the like and a method of manufacturing the same.

2. Description of the Related Art

There has been known various methods of fixing a seat cover of a seat back of a vehicle seat. For example, JP-A-2013-102855 discloses a method of connecting and fixing an end of a seat cover in a groove formed on a backboard at a backside of a seat back. In this method, a carpet is adhered on a surface of the backboard. An end of the carpet is also inserted in the groove of the backboard, like the end of the seat cover.

However, according to the method of JP-A-2013-102855, it is necessary to not only insert and fix the end of the seat cover in the groove of the backboard but also insert and adhere the end of the carpet in the groove, which requires cumbersome operations and deteriorates productivity.

SUMMARY OF THE INVENTION

The present invention has been made in view of the above circumstances, and an object of the present invention is to improve productivity while transmitting movement of inserting a seat cover into a fixing groove to push an end of a carpet into the fixing groove, thereby reducing an operation for inserting the end of the carpet into the groove.

According to an illustrative embodiment of the present invention, there is provided a method of manufacturing a vehicle seat configured by covering a seat cover on a sitting surface side of a seat frame, which functions as a skeleton, via a seat pad provided therebetween and by covering a non-sitting surface side of the seat frame with a carpet which is a surface material having higher stiffness against deformation than the seat cover, the vehicle seat including an end fixing part having a groove into which both ends of the seat cover and the carpet are to be inserted and fixed along a boundary line of the seat cover and the carpet, the method comprising: fixing, to the end of the seat cover, an insertion member having stiffness, which can be inserted and fixed in the groove integrally with the seat cover; arranging the carpet such that the end of the carpet comes out above the groove to cover an entrance of the groove; and inserting the insertion member into the groove to thus push and fix the end of the carpet in the groove while the end of the carpet abuts on the insertion member.

According to the above configuration, when inserting and fixing the respective ends of the seat cover and the carpet in the groove, the end of the carpet is arranged to come out above the groove so as to cover the entrance of the groove and when inserting the insertion member fixed to the seat cover into the groove, the end of the carpet is allowed to abut on the insertion member, so that the insertion member is inserted into the groove and the end of the carpet is also inserted into the groove. Therefore, it is possible to reduce an operation for inserting the end of the carpet in the groove, thereby improving productivity.

According to another illustrative embodiment of the present invention, there is provided a vehicle seat configured by covering a seat cover on a sitting surface side of a seat frame, which functions as a skeleton, via a seat pad provided therebetween and by covering a non-sitting surface side with a carpet which is a surface material having higher stiffness against deformation than the seat cover, the vehicle seat including an end fixing part having a groove into which both ends of the seat cover and the carpet are inserted and fixed along a boundary line of the seat cover and the carpet, wherein an insertion member having stiffness, which can be inserted and fixed in the groove integrally with the seat cover, is provided at the end of the seat cover, and wherein when the insertion member is inserted into the groove at a state where the end of the carpet comes out above the groove so as to cover an entrance of the groove, the end of the carpet is pushed and fixed in the groove while abutting on the insertion member.

According to the above configuration, when inserting and fixing the respective ends of the seat cover and the carpet in the groove, the end of the carpet arranged to come out above the groove so as to cover the entrance of the groove is pushed into the groove with abutting on the insertion member upon insertion of the insertion member fixed to the seat cover into the groove. Therefore, the end of the carpet is simultaneously inserted into the groove upon the operation of inserting the end of the seat cover into the groove. Thereby, it is possible to reduce an operation for inserting the end of the carpet in the groove, thereby improving productivity.

Also, the carpet has the stiffness with which the end thereof is arranged to come out above the groove so as to cover the entrance of the groove. Therefore, the carpet abuts on the seat cover inserted in the groove together with the insertion member with the elastic force at the state where the carpet is inserted in the groove. Thereby, it is possible to prevent generation of a gap between the carpet and the seat cover.

In the above vehicle seat, the insertion member may include a protrusion part having a width larger than a width of the groove, and the end fixing part may be configured to be deformable such that the width of the groove is widened as the insertion member is inserted.

According to the above configuration, the protrusion part of the insertion member is inserted into the groove while deforming the groove. Therefore, the insertion member is press-fitted in the groove and can be thus fixed so that it is not easily separated from the groove.

Also, even when the width of the groove and the width of the protrusion part are somewhat non-uniform, the non-uniformity can be absorbed by the deformation of the groove. Therefore, it is possible to roughly set the manufacturing precision of the width of the groove and the width of the protrusion part.

In the above vehicle seat, the insertion member may include an engaging part which is inserted to the groove, and an extension part which extends in a direction substantially perpendicular to an insertion direction of the insertion member.

In the above vehicle seat, the end fixing part may include a first part which is covered by the seat cover at one side of the groove, and a second part which is covered by the carpet at the other side of the groove, the extension part may be provided on the first part, and the first part may be thinner than the second part such that the seat cover does not protrude even though the extension part is provided on the first part.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Figure 1:
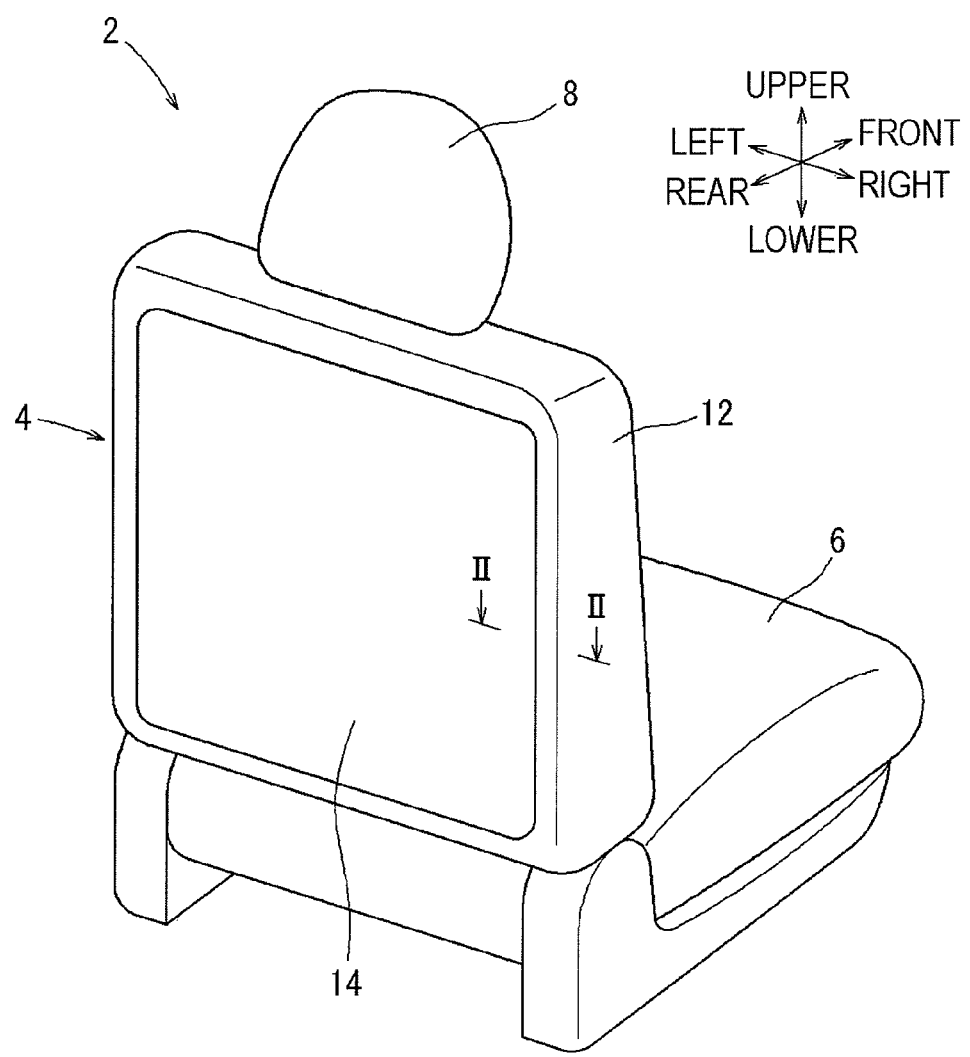
FIG. 1 is a perspective view of a vehicle rear seat according to an illustrative embodiment of the present invention.
Figure 2:
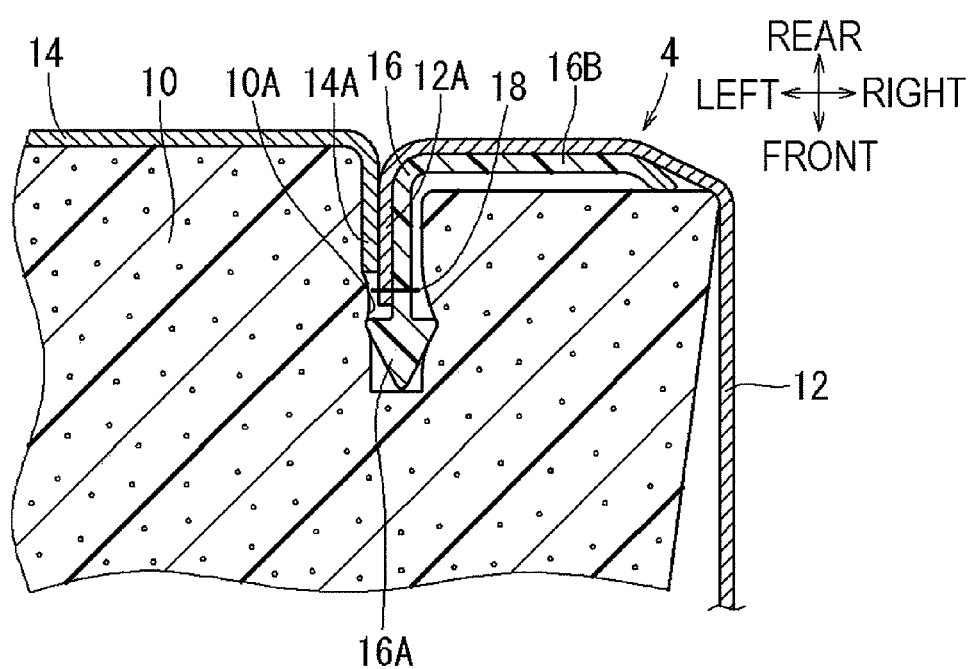
FIG. 2 is a sectional view taken along a line II-II of FIG. 1.
Figure 3:
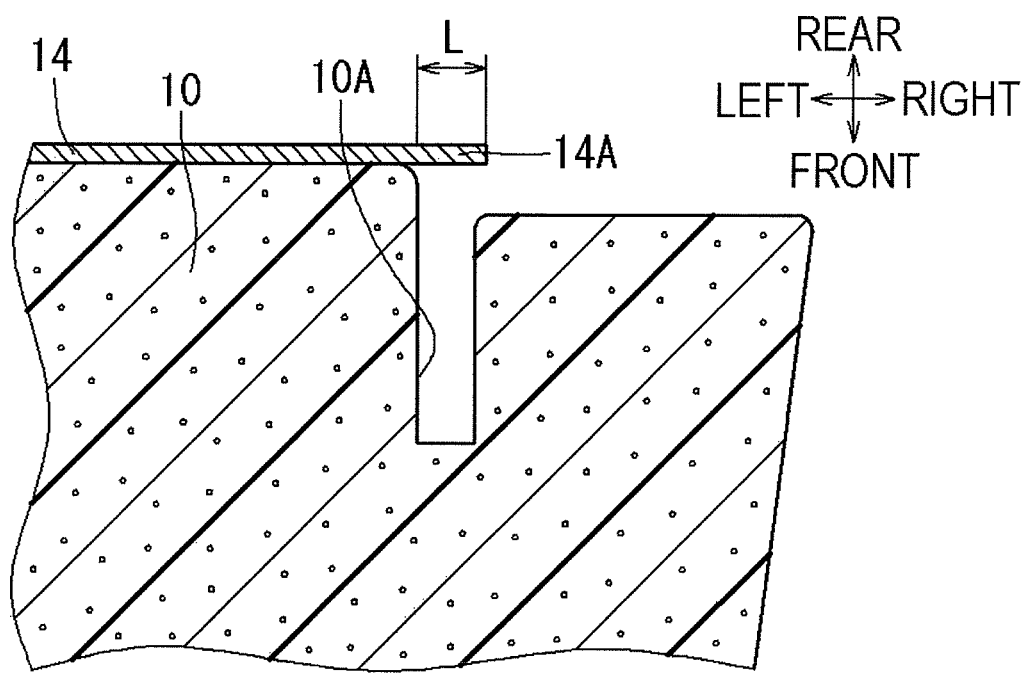
FIG. 3 is the same sectional view as FIG. 2, showing a state before a seat cover is fixed.

FIGS. 1 to 3 show an illustrative embodiment of the present invention. In this illustrative embodiment, the inventive concept of the present invention is applied to a vehicle rear seat (hereinafter, simply referred to as a seat). A seat 2 is a four-side seat in a so-called 6:4 split seat. In the respective drawings, the arrows indicate respective directions when the seat is mounted on a vehicle. In the below descriptions, directions will be described based on the directions shown in the drawings.

The seat 2 mainly includes a seat back 4 and a seat cushion 6, and the seat back 4 has a headrest 8. The seat back 4 is configured by covering a seat cover 12 on a sitting surface side of a back frame (not shown), which functions as a skeleton, via a back pad (not shown) provided therebetween. A backside (a non-sitting surface side) of the back frame is provided with a foamed resin molded body 10 (an example of an end fixing part) by an insert molding using the back frame as an insert material, and a backside carpet (hereinafter, simply referred to as the carpet) 14 is adhered on a backside of the foamed resin molded body 10 by an adhesion or integral molding. Here, the back frame is configured by a combination of a pipe and a wire.

The backside of the foamed resin molded body 10 is formed with a groove 10A conforming to outlines of the seat back 4 in upper-lower and left-right directions. Respective ends 12A, 14A of the seat cover 12 and the carpet 14 are inserted and fixed in the groove 10A.

FIG. 2 shows a structure for inserting the ends 12A, 14A of the seat cover 12 and the carpet 14 into the groove 10A. A plate-shaped resin hook 16 (an example of an insertion member) is stitched to the end 12A of the seat cover 12 by a sewing part 18; and the hook 16 is inserted and fixed in the groove 10A, so that the seat cover 12 is inserted and fixed in the groove 10A. An insertion end portion of the hook 16 is formed integrally with an engaging part 16A (an example of a protrusion part) having an arrowhead shape. When the hook 16 is inserted into the groove 10A, the engaging part 16A pushes and widens a groove width of the groove 10A. After the insertion, sharp portions of both sides of the engaging part 16A bite into an inner wall of the groove 10A, so that the hook 16 is not easily separated from the groove 10A. That is, a width of the engaging part 16A is set to be larger than the groove width of the groove 10A, and the foamed resin molded body 10 is configured to be elastically deformed as the engaging part 16A of the hook 16 is inserted into the groove 10A. For example, the groove width of the groove 10A is 5 mm and the width of the engaging part 16A is 6 to 7 mm. The foamed resin molded body 10 is a foamed body of polypropylene, polyethylene, polystyrene or a composite resin of polyethylene and polystyrene, and the hook 16 is made of polypropylene.

A side of the hook 16 opposite to the engaging part 16A is formed with an extension part 16B extending in a substantially perpendicular direction to the insertion direction of the hook 16. Therefore, when the seat cover 12 is inserted and fixed in the groove 10A together with the hook 16, the extension part 16B prevents the seat cover 12 close to the hook 16 from directly contacting the foamed resin molded body 10, thereby maintaining the surface of the seat cover 12 even. That is, if the extension part 16B were not provided, the seat cover 12 would contact an end portion of the hook 16 and contact the foamed resin molded body 10 at a side of the end portion, so that the surface of the seat cover 12 might become irregular. In contrast, in this illustrative embodiment, a surface of the extension part 16B facing the seat cover 12 is formed to be even, so that it is possible to prevent the surface of the seat cover 12 contacting the surface of the extension part 16B from being irregular.

As can be clearly seen from FIGS. 2 and 3, a part of the foamed resin molded body 10, which is covered by the seat cover 12 at an outer side of the groove 10A, is thinner in the front-rear direction than an inner side surrounded by the groove 10A. Therefore, even when the extension part 16B of the hook 16 is positioned at that part, the seat cover 12 does not protrude from the backside of the seat back 4.

The carpet 14 is formed of a surface material having higher stiffness against the deformation than the seat cover 12. As shown in FIG. 3, the carpet 14 is adhered to the backside of the foamed resin molded body 10. The end 14A extends in a sunshade form so as to cover an entrance of the groove 10A when the end 14A thereof comes out above the groove 10A. For example, a length (a size 'L' in FIG. 3) that the end 14A of the carpet 14 comes out towards the entrance of the groove 10A is 5 mm±2 mm. Therefore, when the hook 16 is inserted into the groove 10A of the foamed resin molded body 10, the end 14A of the carpet 14 is pushed into the groove 10A while abutting on the hook 16, as if it were pushed by the hook 16. When the hook 16 is fixed in the groove 10A, the end 14A of the carpet 14 is also fixed in the groove 10A. At this time, a depth that the end 14A of the carpet 14 is introduced into the groove 10A is set to be shallower than a depth that the engaging part 16A of the hook 16 is introduced into the groove 10A. That is, the end 14A of the carpet 14 is configured not to disturb for the sharp portions of both sides of the engaging part 16A of the hook 16 to bite into the inner wall of the groove 10A.

Accordingly, in the illustrative embodiment, it is possible to insert and fix the carpet 14 and the seat cover 12 in the groove 10A just by inserting the hook 16 into the groove 10A of the foamed resin molded body 10. Therefore, it is possible to reduce an operation for inserting the end 14A of the carpet 14 in the groove 10A, thereby improving the productivity.

Further, since the carpet 14 has the stiffness as described above, the carpet 14 abuts on the seat cover 12 with the elastic force at the state where the carpet 14 is inserted in the groove 10A. Thereby, it is possible to prevent generation of a gap between the carpet 14 and the seat cover 12.

Further, even when the width of the groove 10A and the width of the engaging part 16A of the hook 16 are somewhat non-uniform, the non-uniformity can be absorbed by the deformation of the groove 10A. Therefore, it is possible to roughly set the manufacturing precision of the width of the groove 10A and the width of the engaging part 16A.

Also, the end 14A of the carpet 14 is pushed and fixed in the groove 10A by the hook 16. Therefore, even when length L of the end 14A is non-uniform, the end 14A is always stably fixed in the groove 10A. Also, even when the length L of the end 14A is somewhat long, it is possible to prevent the end 14A, which is not completely introduced into the groove 10A, from forming a wrinkle. The non-uniformity of the length of the seat cover 12 is absorbed by the elastic deformation of the back pad, similarly to the related-art structure. Therefore, it is possible to finely finish the inserted portions of the respective ends 12A, 14A of the seat cover 12 and the carpet 14 into the groove 10A.

In the meantime, the four hooks 16 are provided for the one seat back 4 as shown in FIG. 1 and are respectively arranged one by one on four sides of the groove 10A formed to have a rectangular shape on the backside of the foamed resin molded body 10. Also, the seat cover 12 is seamed into a three-dimensional shape so that it can be easily inserted into the groove 10A, and the carpet 14 is formed with a slit at a corner portion of the groove 10A so that the carpet 14 can be easily inserted into the groove 10A.

While the present invention has been shown and described with reference to certain illustrative embodiments thereof, it will be understood by those skilled in the art that various changes in form and details may be made therein without departing from the spirit and scope of the invention as defined by the appended claims.

1. In the above-described illustrative embodiment, the end fixing part is configured by the foamed resin molded body 10. However, the end fixing part may be configured by a wooden backboard or metallic groove structure.

2. In the above-described illustrative embodiment, the hook 16, which is the insertion member, is press-fitted in the groove 10A, so that the hook 16 is fixed in the groove 10A. However, a tip of the hook 16 may be engaged and fixed by an engaging part formed in the groove.

3. In the above-described illustrative embodiment, the carpet 14 is adhered to the foamed resin molded body 10 which is the end fixing part. However, the carpet may be fixed by a clip.

4. In the above-described illustrative embodiment, the inventive concept of the present invention is applied to the seat back. However, the inventive concept of the present invention may be also applied to the seat cushion. Also, although the inventive concept of the present invention is applied to the rear seat, it may be also applied to a front seat.

5. In the above-described illustrative embodiment, the inventive concept of the present invention is applied to the vehicle seat. However, the inventive concept of the present invention may be also applied to a seat of an airplane, a ship, a train and the like.

What is claimed is:

1. A vehicle seat comprising:
a seat frame, which functions as a skeleton for the vehicle seat;
a seat cover that covers a sitting surface side of the seat frame;
a seat pad provided between the seat frame and the seat cover;
a carpet that covers a non-sitting surface side of the seat frame and includes a terminal free end, the carpet being defined by a surface material having a stiffness against deformation that is higher than a stiffness against deformation of a material that defines the seat cover;
an end fixing part fixed along a boundary line of the seat cover and the carpet, the end fixing part including a groove configured to receive an end of the seat cover and the terminal free end of the carpet; and
an insertion member provided at the end of the seat cover and configured to be inserted and fixed inside the groove integrally with the end of the seat cover,
the insertion member including:
an engaging part which is inserted into the groove; and
an extension part which extends in a direction substantially perpendicular to an insertion direction of the insertion member, wherein
the end fixing part includes a first part which is covered by the seat cover at one side of the groove and a second part which is covered by the carpet at the other side of the groove,
the extension part is configured to be provided on the first part when the insertion member is inserted inside the groove,
the first part is thinner in a front-rear direction of the vehicle seat than the second part such that the seat cover does not protrude rearwardly of the carpet in the front-rear direction even when the extension part is provided on the first part when the insertion member is inserted inside the groove,
when the insertion member is disposed at a location outside of the groove, the terminal free end of the carpet is configured to extend freely above an entrance of the groove so as to cover the entrance of the groove, and
when the insertion member is inserted into the groove, the terminal free end of the carpet is configured to be pushed and fixed in the groove so as to abut against the groove and against the end of the seat cover.

2. The vehicle seat according to claim 1,
wherein the insertion member includes a protrusion part having a width larger than a width of the groove, and
wherein the end fixing part is configured to be deformable such that the width of the groove is widened as the insertion member is inserted.

3. The vehicle seat according to claim 2,
wherein the seat pad comprises a foamed resin molded body, and
wherein the end fixing part is defined within the seat pad.

4. The vehicle seat according to claim 3, wherein the insertion member is fixed in the end fixing part when the protrusion part of the insertion member is directly engaged with the foam resin molded body.

5. The vehicle seat according to claim 1, wherein when the carpet is inserted in the groove, the end of the carpet abuts the seat cover with an elastic force.

6. The vehicle seat according to claim 1, wherein
the extension part includes a bent portion at an end of the extension part, the bent portion extending off of the perpendicular direction to define an angle between the bent portion and a body portion of the extension part, and
the extension part prevents a portion of the seat cover, located proximate to the insertion member, from contacting the seat pad.

7. The vehicle seat according to claim 1, wherein the second part extends rearwardly of the extension part in the front-rear direction of the vehicle.

* * * * *